United States Patent
Lane

Patent Number: 5,195,504
Date of Patent: Mar. 23, 1993

[54] PORTABLE SOLAR OVEN

[76] Inventor: Bert Lane, 3675 N. Cnty. Cl. Dr. #208, North Miami Beach, Fla. 33180

[21] Appl. No.: 770,226

[22] Filed: Oct. 2, 1991

Related U.S. Application Data

[63] Continuation-in-part of Ser. No. 605,672, Oct. 29, 1990, abandoned.

[51] Int. Cl.⁵ ................................................ F24J 2/02
[52] U.S. Cl. ..................................... 126/682; 126/709; 126/608
[58] Field of Search ................ 126/451, 450, 417, 439

[56] References Cited

U.S. PATENT DOCUMENTS

| | | | |
|---|---|---|---|
| 3,025,851 | 3/1962 | Steinberg | 126/451 |
| 4,070,861 | 1/1978 | Scragg et al. | 126/451 |
| 4,848,320 | 7/1989 | Burns et al. | 126/451 |

*Primary Examiner*—Larry Jones

[57] ABSTRACT

An improved affordable, rugged, but light-weight box-oven-type solar cooker with the ability to overcome the recognized prior art limitations, such as: difficulty in achieving cooking temperatures in morning, evening and winter; restriction in reflector adjustment; heat loss through glazier cover; the inability to produce high temperatures in a short period of time and, more importantly, the inability of heat storage to continue cooking after sundown. The cooker assembly comprises a revolutionary round or hemispherical shaped cooking chamber (16) allowing the maximum amount of sunlight to cover its inner surface, creating a higher and more even heat distribution for cooking; an unhinged reflector frame (30) is pivotally mounted by arms (38R; 38L) to the housing (10) and can adjust through a 360° angle. With this unlimited mobility the sun's rays can be focused into the cooking chamber (16) substantially at any angle of the sun's position regardless of time of day, or geographic location. A glazier frame (22) accommodates at least three glaziers (28) and disallows much of the heat loss from the cooking chamber (16). A first glazier, because of its close proximity to the chamber, acts as a lid or cover and protects against further heat loss. An overhead booster reflector (44) may be added to the reflector frame. The subject assembly may be capable of heat storage utilizing a heat collecting fluid and allows cooking to continue during periods of cloud cover and even hours.

19 Claims, 3 Drawing Sheets

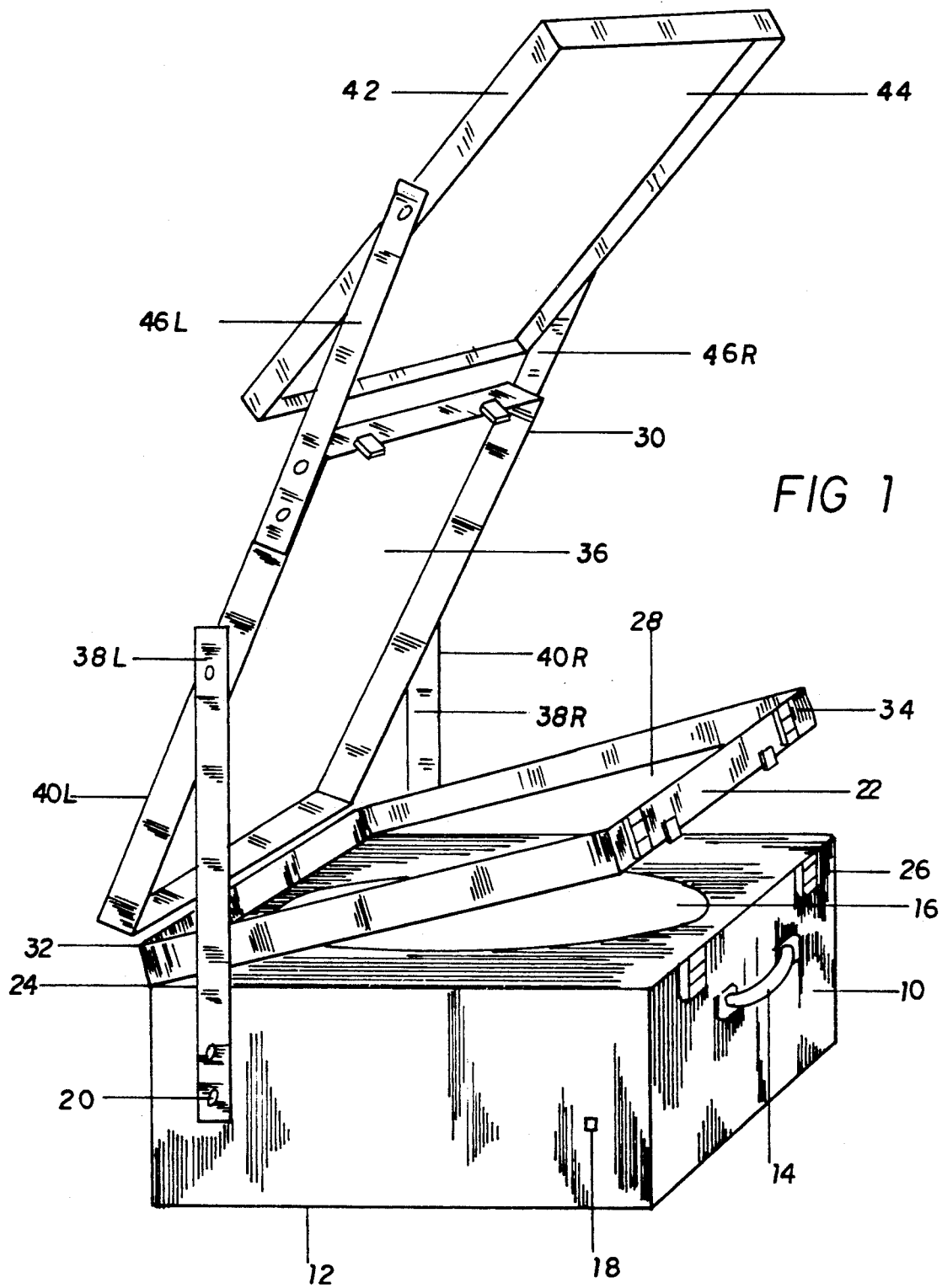

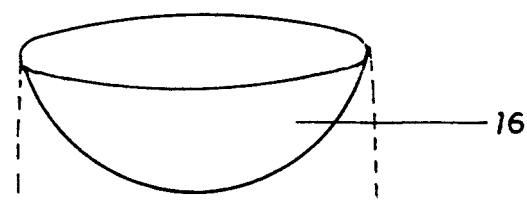
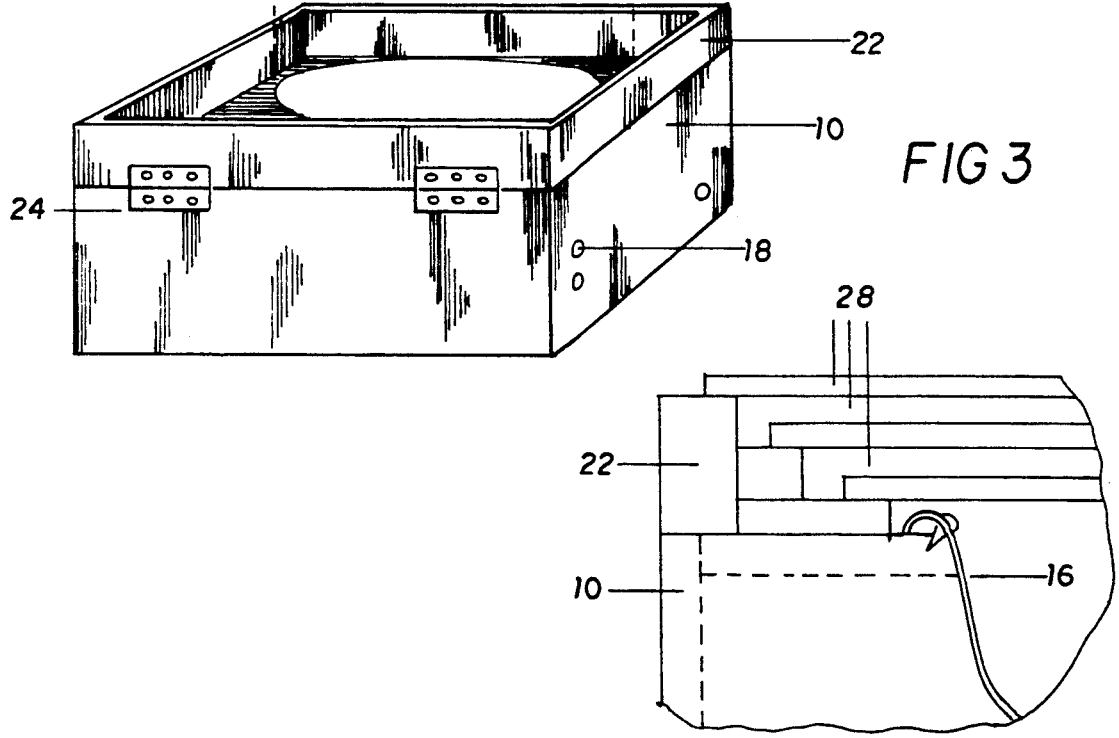

PORTABLE SOLAR OVEN

BACKGROUND OF THE INVENTION

This is a continuation-in-part application of presently pending Ser. No. 07/605,672, filed on Oct. 29, 1990 abandoned.

FIELD OF THE INVENTION

This invention relates to solar cooking by means of an improved solar box-type oven.

DESCRIPTION OF THE PRIOR ART

The destruction of the Third World's forests, to a larger degree because of the insatiable need for cooking fires, the pollution produced by charcoal cookers throughout the world, and the ever-increasing costs of conventional fuels, has combined to create a greater need for a practical solar cooker.

Heretofore, solar cookers have not filled the world's needs inasmuch a most of them have been only copies of each other with some deviation of design, but not in performance. Most solar cookers are too heavy to be conveniently portable. They are cumbersome, slow to heat in early morning and late afternoon, crude in operation, expensive to purchase, not functional after sundown and in northern winter climates, quickly lose temperature with close cover.

Existing prior art Patents relevant to the subject matter of the present invention includes Steinberg, U.S. Pat. No. 3,025,851. The Steinberg structure or solar oven has four small reflective panels and one glazier and vertical adjustment capabilities relative to the sun by rotating the entire housing absent any horizontal solar tracking features.

The U.S. Pat. No. 4,637,376, to Varney, et al., is directed to a solar oven with a cavity for maximizing the cavity's heat retention that is shaped in somewhat of a wok-like configuration. However, more specifically, the shape can more accurately be described as an inverted pyramid, including a combination of shapes with a rectangular upper aperture and angled sidewalls and a concavely curved chamber bottom. Varney emphasizes his inverted pyramid structure as an improvement over shaped heating chambers of the prior art and specifically points out that air is a relatively inefficient heat transfer medium so that even though air may be quite hot, the transfer of heat from the air to the material to be heated is poor and consequently time consuming.

The U.S. Pat. No. 4,850,339, to Ghatak, discloses a solar powered cooker or oven assembly including a mirror combination which is hinged to a glass retaining frame wherein the structure is such that several positions or angles of the reflector are possible. It should be noted, however, that in this structure solar oven reflector frames that are permanently hinged to the housing's glazier frames greatly restricts the scope of mobility, thus restricting its maximum usefulness.

SUMMARY OF THE INVENTION

Accordingly, several objects and advantages of my cooker are: it combines the best features of both parabolic and solar oven cooking. The round, or hemispherical, wok-shaped cooking chamber (a unique shape to solar ovens) allows uninterrupted convectionary action, thus creating faster and more even heating than do the square or corner shaped chambers of other solar ovens. The round shape is also more durable and practical for construction because o the availability of a wide variety of ready-made items such as stainless steel mixing bowls, metal dish pans. and steel woks, thus eliminating the high costs of specialized manufacturing.

The unique wide scope of reflector mirror adjustment, which operates on a pivot, and its attachable overhead booster mirror (independently adjustable on its own pivot) allows the cooker to utilize the maximum of solar heat concentration (with a full 360 range), both in early morning and late afternoon. (Most box-type cooker reflectors are permanently hinged to the back of the housing or have rigid flaps that surround the cooking area. Both types, because of their limited adjustments, greatly hamper cooking during periods of reduced sun power. The adjustable reflector (disallowing the overhead booster), due to the range in its backward and forward movement, creates a double reflection from both the top and bottom thus increasing the intensity of reflection.

The attachment of two arms to the housing has a dual-purpose design: it supports the pivoting reflector frame and allows high winds to blow through the cooker without disturbance; whereas, when the reflector is hinged to housing, or the reflectors are rigid flaps, it acts as a wind barrier which may create destructive damage, especially when one arm is used to prop up the reflector. (A popular commercial cooker uses such an arm device.) The two detachable reflector arms may be removed and attached to either side of the housing when disassembling the cooker for portability.

The top glazier portion is the vulnerability of solar ovens because it is the least insulated area thus allowing the greatest amount of heat loss and will crack under stress. The glazier frame of my Sunny Cooker is constructed so that thee glaziers (most solar ovens have one or two maximum) may be used at once. The use of a third glazier allows the temperature in the cooking chamber to rise significantly and conserve heat for a longer duration (used best in cold climates). The glaziers rest unattached on their own frames so as to allow for the rapid expansion due to a sudden rise in temperature, and unattached glaziers are easy to clean. (Clean glaziers are vital to obtain maximum heat concentration). This innovation also allows glaziers to be made from simple, inexpensive single-strength window glass (most other cookers use an attached expensive double-strength glass or plastic because they lack an adequate glazier expansion system).

Another innovation, which I have dubbed the "thermal cover", is the first glazier of the glazier frame which nearly touches the top of the cooking chamber. This thermal cover, which forces the heat to remain in the chamber, also accounts for quicker and higher temperature build-up.

Another major drawback to solar cooking: cooking is significantly reduced during periods of cloud cover and ceases after sunset because of a sudden hat loss to the cooking chamber. I have overcome this important problem with an innovation I call the "Sunny Sundowner". This is a modified Sunny Cooker (with a slightly larger housing or a smaller cooking chamber) with a few simple changes: the top of the housing is made of metal and the cooking chamber is welded into its hold after which the top (with attached cooking chamber) is welded onto a water-tight metal box (which I call the "heat collector chamber"). This chamber is placed into the housing and the space between it and housing is filled with insulation. The chamber is filled with oil through an opening in the top. (A variety of oils may be used.) The heat accumulation in the heat collector chamber during the sunny portions of the day permits uninterrupted daytime cooking during cloud-covered periods and well into late afternoon and early evening.

An attached swivel to the cooker's bottom allows easy fingertip adjustment to the horizontal rotation of the earth to the sun.

When not in use, the Sunny can be closed in such a way as to become a baggage-shaped portable case, carried by a sturdy handle.

Further objects and advantages of the Sunny Solar Cooking will become more clearly apparent from a consideration of the drawings and ensuing description of it.

BRIEF DESCRIPTION OF THE DRAWINGS

For a fuller understanding of the present invention, reference is had to the following detailed description taken in connection with the accompanying drawings in which:

FIG. 1 shows a side, front and top view perspective of the entire basic cooker with the overhead booster reflector attached to the reflector frame.

FIG. 2 shows a perspective back, side and top view of the pan which is placed into oven box to become the unique wok-shaped cooking chamber.

FIG. 3 is an exploded cross-cut section of the glazier frame showing the placement of the three glaziers: the bottom thermal cover, the second and third in perspective placement over the cooking chamber.

Like reference numerals refer to like parts throughout the several views of the Drawings.

DETAILED DESCRIPTION OF THE PREFERRED EMBODIMENT

Figure 4:
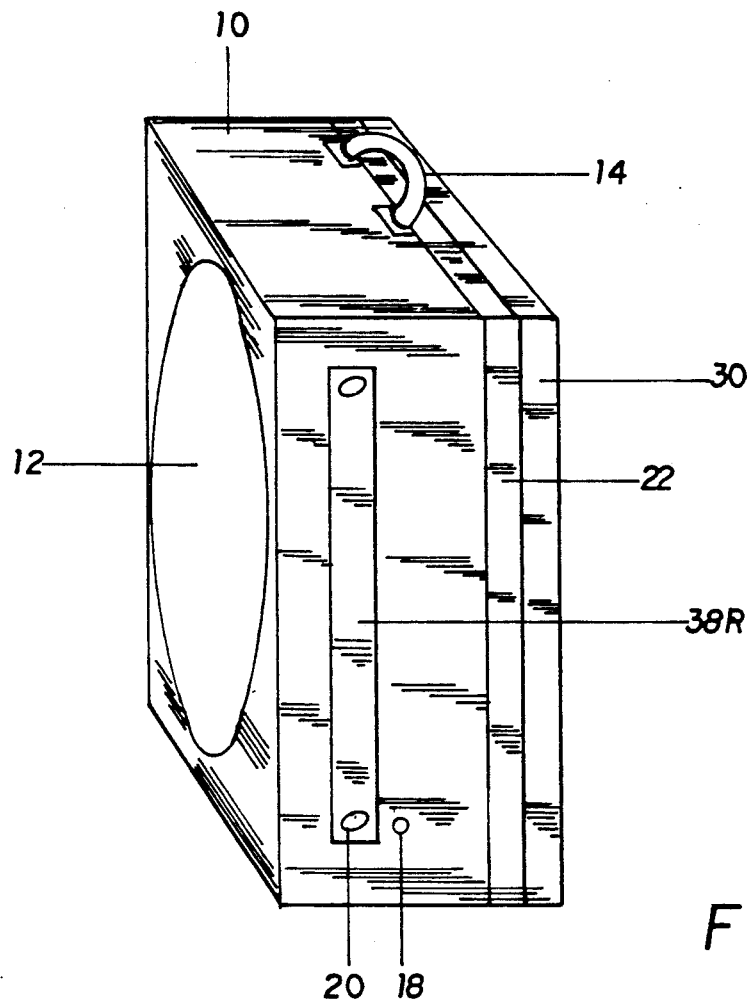
FIG. 4 shows the side, back and top view of the cooker closing, resting on its back, secured in a portable position.

The structural description of the cooker: FIG. 1 shows the completed embodiment of the cooker. The housing 10 may be constructed of a one-piece mold from materials such as plastic, fiberglass, or can be made of metal or wood. If wood is used: four side pieces are glued and nailed to form a square and one bottom and one top piece are cut to fit inner side dimensions. Bottom is glued and nailed flush in place by nails driven into outer housing 10. Top piece is glued and nailed into a wooden rib section that is secured to near the top of the inner housing 10 so that the top piece, when inserted, will be flush. A hole is cut in the top to allow a pan used for the cooking chamber 16, to fit snugly with the pan's lip overlapping the hole. Two reflector frame arms 38R;38L (made of any sturdy material such as wood) are attached to the side rear of housing 10 by thumb screws 20 (through two holes drilled into arms 38R;38L and housing 10) screwed into holes fitted with T-nuts 18 from inner housing 10 on either side (see FIG. 1). Housing cavity is filled with insulation materials. Several kinds may be used if they do not contain harmful outgassing properties. Cooking chamber 16 is fastened to the housing 10 by securing the lip with glue, screws or nails.

The glazier frame 22 is made of molded materials or wood with an equal dimension of the housing 10. If using wood, glue and nail ends together, then attach four rib pieces inside frame near the bottom; turn frame upside down and attach four other rib pieces to the first ribs (twice the width of first) so that glazier frame's bottom is flat. Glaziers 28 will rest on these rib pieces (see FIG. 3).

Reflector frame 30 is made of molded materials or wood; if using wood, glue and nail ends with an equal dimension of the glazier frame 22. Reflector frame 30 is attached to the housing 10 with reflector frame arms 38R;38L (see FIG. 1). Drill holes into the upper portion of arms 38R;38L into center of the reflector frame 30. Nail T-nuts 18 into frame holes from inside. Reflector frame arms 38R;38L are attached to reflector frame 30 with thumb screws 20 through arm holes into T-nuts 18 in reflector frame 30 (see FIG. 1). Attach four ribs inside of reflector frame 30 flush to front. Before securing, notch rib pieces that will come into contact with T-nuts 18. The reflector 36 (made of reflecting metal, plexi-mirror or glass mirror) is cut to the equal dimensions of the inner reflector frame 30 and inserted into frame from the back, held in place by the inserted ribs. A cushion material, such as cardboard, may be placed on back of reflector 36. A sturdy thin material such as wood or masonite is attached to the outer dimensions of the reflector frame 30.

The booster reflector frame 42 is constructed in the exact manner of the reflector frame 30 as shown in FIG. 1. Booster reflector arms 46R;46L may be shorter in length and made of lighter weight material than the reflector frame arms 38R;38L. Because of the added weight burden of the booster reflector frame 42, removable reflector arm braces 40R;40L are attached to the reflector fame arms 38R;38L and the reflector frame 30. All this can be seen clearly in FIG. 1.

The subject assembly of FIG. 1 is a solar operated cooking oven and can also be used for a wide variety of uses where high temperatures are necessary for their function.

As an oven for food preparation, the cooker is powered by solar energy. This is accomplished by trapping, during periods of sun, short waves (heat waves) and repelling dangerous long waves by means of transparent glaziers 28 placed over a heat-absorbing cooking chamber 16 painted a dark, heat resistant paint which, on contact with short waves, turns to heat.

The housing 10 primary function, besides protecting the cooking chamber 16 against physical damage, is to protect against heat loss. This is done by an insulating material placed between the inner housing 10 and the chamber. The housing 10 is also the anchor for the reflector mirror arms 38R;38L by means of thumb screws 20 (see FIG. 1), and the glazier frame 22 and reflector frame 30 by hinges located n the rear of housing 10. The glazier frame 22, shown in FIGS. 1, 2 and 3, contains three levels where up to three glaziers 28 can rest securely, but with room for heat expansion (the glaziers are cut smaller than the level openings) and can be removed easily for cleaning or replacement. The glazier frame 22 is attached permanently to the housing 10 by hinges 24 at rear shown in FIG. 2 and by chest latches 26 at the front as in FIG. 1. The glazier frame 22 is painted with heat resistant paint to withstand the high temperatures in the cooking chamber 16. Glaziers 28 can be made of any clear heat resistant material, such as single-strength glass, to allow sort wave penetration, but prevent their escape. The accumulation of these waves accounts for the high temperature produced in the cooking chamber 16.

The reflector frame 30 contains one inter-level of ribs that retain the reflector 36. In addition, when closed, it becomes a sturdy top for the cooker. When not in use in a closed position (see FIG. 4), the reflector frame 30 is secured to the glazier frame 22 by detachable hinges at the rear of housing 10 and by chest latches 26 in the front, shown in FIG. 1. When in use, the reflector frame 30 is secured to the housing 10 by the two reflector arms 38R;38L by means of thumb screws 20 that are screwed into T-nuts 18 attached to the center of the frame at both sides, all shown clearly in FIG. 1. The reflector 36 is essential to basic solar cooking to achieve normal cooking temperatures, an added means of projecting sunlight into the cooking chamber 16, especially in early morning and late evening when the position of the sun does not allow sun rays to reach the chamber 16 naturally. The reflector frame arms 38R;38L are possibly the most unique and important innovation of the Sunny Cooker inasmuch as most solar oven cookers have a fixed-hinged reflector or unadjustable flaps that greatly reduce the scope of mobility, thus limiting their capability of reflection. The reflector frame arms 38R;38L of the Sunny, because of their swivel nature allow complete adjustment to all vertical movements of the sun. This creates a basic cooker which can utilize the maximum solar energy in early morning or late afternoon in any geographic or climatic zones in the world. This feature is especially important for winter cooking in the extreme northern or southern hemispheres. An added bonus of this reflector mobility is a double mirror reflection from the top as well as the bottom portion of the mirror at certain times of the day that a fixed or hinged mirror could not allow.

The booster reflector 44, shown in FIG. 1, gives the basic cooker the added dimension of instant heat as would be found in parabolic solar cooking, especially during periods when the capabilities of solar cooking is limited such as winter, morning, evening and when a shortened cooking time is desired. The function of the booster reflector 44, as the name implies, is to boost the reflectability of the primary reflector 36 with an additional layer of sunlight. The capability of the booster reflector 44 to complete its purpose is greatly enhanced by the same swivel maneuverability as the primary reflector 36 (see FIG. 1). The booster reflector 44 concentrates a wide bean of additional sunlight which produces high temperatures in the cooking chamber 16 un a short period of time.

The subject cooker assembly includes a modification of the basic assembly that gives it the capability of heat storage. This is realized by the incorporation of a heat collector chamber 48 and the cooking chamber 16 by welding the two together in such a way as to produce a watertight seal, clearly shown in FIG. 5. The heat collector 48 stores heat energy emitted by the cooking chamber 16. This heat is collected by an oil solution which fills the heat collector chamber 48 insulated from the housing 10. The oil, shown in FIG. 5, holds the heat it has gathered during the day which allows the continuation of the cooking process well into the evening hours, explaining its name: the Sunny Sundowner.

Figure 5:
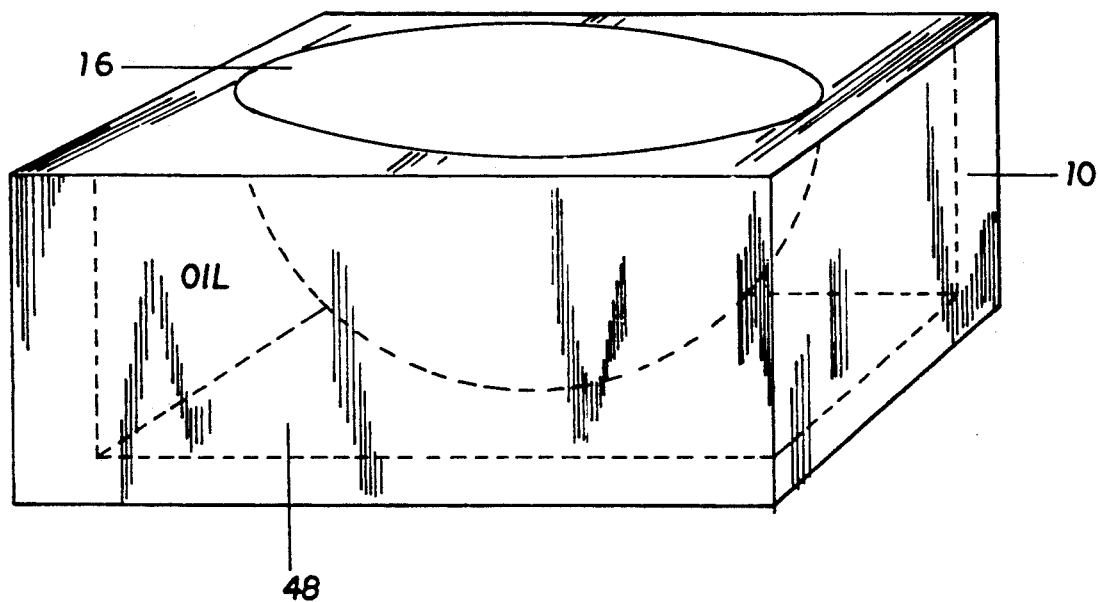
FIG. 5 shows a top and inner housing perspective of the cooking chamber welded into the metal top of the oil-containing heat collector chamber.

FIG. 1 through 5 shows the primary embodiment of the cooker assembly, emphasizing the most notable features. In FIG. 2, the practical yet hemispherical wok-shaped cooking chamber 16, and in FIG. 1 includes the reflector frame 30, the important system of full reflector mobility made possible by independent swivel adjustment a great improvement over stationary reflector flaps or hinged reflector adjustors. FIG. 3 shows the thermal cover and the use of three or more glaziers 28 (compared to one or two of most solar ovens) which greatly reduces heat loss from the glazier area. FIG. 1 shows the capability of the booster reflector 44 to produce almost instant heat, giving the cooker the added dimension of parabolic cooking. FIG. 5 shows the most diversified innovation that changes the basic assembly wherein a cooker capable of heat storage by adding a liquid-tight, oil-filled heat collector chamber 48.

Although solar science has been greatly advanced in the last few decades, solar cooking, the most needed in the world, has been completely overlooked. The main purpose of the subject assembly is to fill this technical gap by the embodiment of simple, yet important, innovations mentioned above, the lack of which, until now, has given good cause for pessimism toward solar cooking. My cooker has utilized inexpensive materials in producing an energy cost-free, pollution-free, range that can be used by Western Nations and yet affordable to fill the acute demand felt by Third World's everyday cooking needs.

While the above description contains my specifications, the reader should not construe these as limitations on the scope of the invention, but merely as exemplifications of embodiments thereof. It would not be difficult to envision numerous more innovations, deviations and applications for more convenient cooking and those outside the scope of cooking such as: size and shape of the housing 10; an innovation which would produce a hybrid cooker simply by turning light into heat by inserting light bulbs placed into the cooking chamber 16 with an AC/DC power source to boost solar cooking in unfavorable conditions, at night or in the kitchen at any time; Food Drying, accomplished by simply removing the glaziers 28 in FIG. 3, allowing food drying on an aerated frame; Water Purification: water boiling, a simple task for the Sunny to produce much needed safe drinking water for the Third World; Water Desalination: changing sea (or other grossly contaminated water) into pure water by merely placing a distilling apparatus into the cooking chamber 16; Sterilizer: sterilization application used in countless ways, especially for use to doctors and hospitals of underdeveloped nations. Accordingly, the reader is requested to determine the scope of the invention by the appended claims and their legal equivalents and to by the examples hereby given.

What is claimed is:

1. A portable cooking assembly comprising:
   a) a housing having a hollow interior and including a heat collector chamber defined within said hollow interior,
   b) a cooking chamber mounted on said housing and disposed within said heating chamber and including an open end disposed adjacent an exposed inner face of said housing,
   c) a glazier assembly comprising at least one transparent material glazier pivotally mounted on said housing into and out of substantially covering relation to said open end of said heat collector chamber,
   d) a reflector assembly including a reflector frame and a reflector mounted there on and adjustable to reflect light through said at least one glazier into said cooking chamber and said reflector frame and reflector movably mounted on said housing and positionable between an operative position and a closed position, e) support means mounted on said housing and adapted for movably supporting said reflector assembly substantially above and in outwardly spaced relation to said housing when said reflector assembly is in said operative position, f) said reflector assembly adapted when in said operative position to have substantially an entire periphery thereof pivotally adjustable in above, spaced relation to said cooking chamber, g) said closed position being defined by said reflector frame and reflector disposed in overlying relation to said glazier assembly and in closed, covering relation to said cooking chamber.

2. An assembly as in claim 1 wherein said support means comprises a pair of support arms each having one end attached to said housing and said pair of support arms extending outwardly and upwardly from said cooking chamber, said reflector frame and reflector pivotally mounted to an outer end of each support arm in completely spaced apart relation to said housing.

3. An assembly as in claim 1 wherein said reflector assembly further comprises a booster reflector assembly including a booster reflector movably connected in spaced relation to said reflector frame and reflector and in outwardly spaced relation to said cooking chamber and movable with said reflector frame.

4. An assembly as in claim 3 wherein said booster reflector assembly comprises a booster frame and said booster reflector mounted thereon and pivotally connected to said reflector frame.

5. An assembly as in claim 5 further comprising booster support arms each having one end secured to said reflector frame and an opposite outer end pivotally secured to said booster frame.

6. An assembly as in claim 5 wherein said glazier assembly comprises a plurality of glaziers mounted on a glazier frame in spaced, substantially parallel relation to one another.

7. An assembly as in claim 6 wherein an innermost one of said plurality of glaziers is selectively positioned into and out of overlying, covering relation to said open end of said cooking chamber.

8. An assembly as in claim 6 wherein said glazier frame is structurally adapted to allow at least minimal expansion of each glazier independently of one another due to exposure of said plurality of glaziers to heat.

9. An assembly as in claim 1 wherein said cooking chamber comprises a substantially hemispherical configuration and having exterior surfaces thereof disposed in spaced relation to interior surface portions of said heat collector chamber.

10. An assembly as in claim 9 wherein said heat collector chamber is structurally adapted to be substantially liquid-tight.

11. An assembly as in claim 9 further comprising heat collecting fluid maintained within said heat collector chamber in heat transferring engagement with said exterior surface of said cooking chamber.

12. An assembly as in claim 11 wherein said heat collecting fluid is oil.

13. An assembly as in claim 1 wherein said cooking chamber has exterior surfaces thereof disposed in spaced relation to interior surface portions of said heat collector chamber.

14. An assembly as in claim 13 wherein said heat collector chamber is structurally adapted to be substantially liquid-tight.

15. An assembly as in claim 13 further comprising heat collecting fluid maintained within said heat collector chamber in heat transferring engagement with said exterior surfaces of said cooking chamber.

16. An assembly as in claim 15 wherein said heat collecting fluid is oil.

17. An assembly as in claim 1 further comprising swivel means secured to an under portion of the housing and disposed relative thereto for movably supporting the housing on a supporting surface; said swivel means adapted to allow horizontal adjustment of the housing relative to the support surface.

18. A portable solar cooking assembly comprising:
a) a housing having a hollow interior and including a heat collector chamber defined within said hollow interior,
b) a cooking chamber mounted on said housing and disposed within said heating collector chamber and including an open end disposed adjacent an exposed inner face of said housing,
c) a glazier assembly comprising at least one transparent material glazier movably mounted on said housing into and out of substantially covering relation to said open end of said heat collector chamber,
d) a reflector assembly including a reflector frame and a reflector mounted thereon and adjustable to reflect light through said at least one glazier into said cooking chamber and said reflector frame and reflector movably mounted on said housing and positionable between an operative position and a closed position,
e) support means mounted on said housing and adapted for movably supporting said reflector assembly substantially above and in outwardly spaced relation to said housing when said reflector assembly is in said operative position,
f) said reflector assembly adapted when in said operative position to have substantially an entire periphery thereof pivotally adjustable in above, spaced relation to said cooking chamber,
g) said reflecting assembly further comprising a booster reflector assembly including a booster reflector movably connected in spaced relation to said reflector frame and reflector and in outwardly spaced relation to said cooking chamber and movable with said reflector frame relative to said housing.

19. An assembly as in claim 18 wherein said booster reflector assembly comprises a booster frame and said booster reflector mounted there on and pivotally connected to said reflector frame; said booster reflector assembly further comprising booster support arms each having one end secured to said reflector frame and an opposite outer end pivotally secured to said booster frame.

* * * * *